(12) United States Patent
Schedl (10) Patent No.: US 10,359,088 B2
(45) Date of Patent: Jul. 23, 2019

(54) SELF-LOCKING GEAR AND PEOPLE CONVEYOR COMPRISING A SELF-LOCKING GEAR

(71) Applicant: Otis Elevator Company, Farmington, CT (US)

(72) Inventor: Philipp Schedl, Vienna (AT)

(73) Assignee: OTIS ELEVATOR COMPANY, Farmington, CT (US)

( * ) Notice: Subject to any disclaimer, the term of this patent is extended or adjusted under 35 U.S.C. 154(b) by 23 days.

(21) Appl. No.: 15/846,644

(22) Filed: Dec. 19, 2017

(65) Prior Publication Data

US 2018/0172094 A1    Jun. 21, 2018

(30) Foreign Application Priority Data

Dec. 21, 2016   (EP) ..................................... 16205621

(51) Int. Cl.

| F16H 1/32 | (2006.01) |
|---|---|
| F16H 1/46 | (2006.01) |
| B66B 21/02 | (2006.01) |
| B66B 21/10 | (2006.01) |
| B66B 23/02 | (2006.01) |
| B66B 25/00 | (2006.01) |

(Continued)

(52) U.S. Cl.
CPC .............. *F16D 59/00* (2013.01); *B66B 21/02* (2013.01); *B66B 23/026* (2013.01); *B66B 25/006* (2013.01); *B66B 29/00* (2013.01); *F16D 63/006* (2013.01); *F16H 1/32* (2013.01); *F16H 1/46* (2013.01); *F16H 21/14* (2013.01); *F16H 35/00* (2013.01); *B66B 21/10* (2013.01); *F16D 2121/14* (2013.01); *F16D 2125/50* (2013.01); *F16H 2035/006* (2013.01)

(58) Field of Classification Search
CPC ..... B66B 23/02; B66B 23/026; B66B 25/006; B66B 29/00; B66B 21/02; B66B 21/10; F16H 21/14; F16H 1/32; F16H 1/46; F16H 35/00; F16H 2035/006; F16D 59/00; F16D 63/006; F16D 2121/14; F16D 2125/50
See application file for complete search history.

(56) References Cited

U.S. PATENT DOCUMENTS

| 1,200,502 A | 10/1916 | Griffith |
| 4,099,427 A * | 7/1978 | Fickelscher ............... F16H 1/32 475/176 |

(Continued)

FOREIGN PATENT DOCUMENTS

| CN | 2509156 Y | 9/2002 |
| CN | 2598972 Y | 1/2004 |

(Continued)

OTHER PUBLICATIONS

European Search Report for application EP 16205621.2, dated Jul. 3, 2017, 8 pages.

*Primary Examiner* — Mark A Deuble
(74) *Attorney, Agent, or Firm* — Cantor Colburen LLP (57) ABSTRACT

A people conveyor (10) comprises: a chain of conveyance elements (12), which are configured for conveying people; a drive unit (14), which is configured for driving the chain of conveyance elements (12); and a self-locking gear (20; 40), which is configured to lock when no torque is transmitted from the drive unit (14) to the chain of conveyance elements (12).

15 Claims, 8 Drawing Sheets

(51) Int. Cl.
*B66B 29/00* (2006.01)
*F16D 59/00* (2006.01)
*F16D 63/00* (2006.01)
*F16H 21/14* (2006.01)
*F16H 35/00* (2006.01)
*F16D 121/14* (2012.01)
*F16D 125/50* (2012.01)

(56) References Cited

U.S. PATENT DOCUMENTS

| | | | | |
|---|---|---|---|---|
| 4,407,544 A * | 10/1983 | Bahring | ............... | B60N 2/2252 |
| | | | | 297/362 |
| 4,780,785 A | 10/1988 | Schabert et al. | | |
| 5,957,804 A | 9/1999 | Schulz et al. | | |
| 7,597,172 B1 | 10/2009 | Kovach et al. | | |
| 2008/0305908 A1 * | 12/2008 | Tamenaga | ................ | F16H 1/32 |
| | | | | 475/162 |
| 2010/0199796 A1 * | 8/2010 | Nakamura | ............... | B25J 9/102 |
| | | | | 74/490.03 |
| 2012/0108381 A1 * | 5/2012 | Nakamura | ................ | F16H 1/32 |
| | | | | 475/180 |
| 2012/0283062 A1 * | 11/2012 | Nakamura | ................ | F16H 1/32 |
| | | | | 475/159 |
| 2015/0176680 A1 * | 6/2015 | Fujimoto | ................... | F16H 1/32 |
| | | | | 475/162 |
| 2015/0211392 A1 * | 7/2015 | Otsubo | ................... | F01L 1/352 |
| | | | | 475/162 |
| 2017/0095935 A1 * | 4/2017 | Kim | ......................... | F16H 1/32 |

FOREIGN PATENT DOCUMENTS

| | | |
|---|---|---|
| CN | 1760107 A | 4/2006 |
| CN | 101832367 A | 9/2010 |
| CN | 102653121 A | 9/2012 |
| CN | 102745582 A | 10/2012 |
| CN | 104019190 A | 9/2014 |
| CN | 104747659 A | 7/2015 |
| CN | 205118145 U | 3/2016 |
| DE | 10127676 A1 | 12/2002 |
| DE | 202009010093 U1 | 10/2009 |
| JP | H1121061 A | 1/1999 |
| JP | 2005145603 A | 6/2005 |
| JP | 4961225 B2 | 6/2012 |
| WO | 2016154925 A1 | 10/2016 |

* cited by examiner

SELF-LOCKING GEAR AND PEOPLE CONVEYOR COMPRISING A SELF-LOCKING GEAR

The invention relates to a self-locking gear, in particular to a self-locking gear which is configured to be employed in a people conveyor. The invention further relates to a people conveyor comprising such a self-locking gear and to a method of operating such a people conveyor.

A people conveyor such as an escalator or a moving walkway typically comprises a chain of conveyance elements, such as pallets or steps, which are configured for conveying people, and a drive unit, which is configured for driving the chain of conveyance elements. Torque provided by the drive unit is transmitted to the chain of conveyance elements via transmission elements, which in particular may include chains and/or belts.

In particular in configurations in which the chain of conveyance elements extends between different levels of height, such as different floors of a building, there is a risk that the conveyance elements will move downwards in an uncontrolled manner in case the drive unit and/or at least one of the transmission elements fails.

It is desirable to avoid such an uncontrolled movement of the conveyance elements.

According to an exemplary embodiment of the invention, a self-locking gear comprises: a rotatable input element; an internally toothed outer gear, which is configured to act as an output element; an externally toothed inner gear, which is arranged within the outer gear and which has a smaller diameter and fewer teeth than the outer gear; and a plurality of eccentric elements extending parallel to the input element. Each of the eccentric elements is arranged in a corresponding circular opening formed within the inner gear such that the eccentric element is rotatable around a first axis extending through the center of the respective circular opening. The input element is drivingly coupled to at least two eccentric elements such as to rotate each of the at least two eccentric elements around a respective second axis, which is arranged parallel and eccentric to the first axis of the respective eccentric element. The openings and the eccentric elements in particular may be arranged symmetrically with respect to the center of the inner gear.

According to another exemplary embodiment of the invention, a self-locking gear comprises a housing; an internally toothed outer gear, which is rotatable with respect to the housing and which is configured to act as an output element; an externally toothed inner gear, which is arranged within the outer gear and which has a smaller diameter and fewer teeth than the outer gear; a first eccentric element comprising a first portion, which is configured to act as input element, and a second portion, which is eccentric with respect to the first portion and which is connected to the inner gear so that the inner gear moves along an eccentric path when the input element rotates around the axis of the first portion. The self-locking gear further comprises second and third eccentric elements extending parallel to the first eccentric element. Each of the second and third eccentric elements comprises a first cylindrical portion having a first axis, and a second cylindrical portion having a second axis, which extends parallel and eccentric with respect to the first axis. The second cylindrical portion is arranged in a corresponding circular opening, which is formed within the inner gear, such that the respective eccentric element is rotatable around the second axis. The self-locking gear also comprises a fourth eccentric element, which is attached to the housing and which comprises a cavity, wherein the second cylindrical portion of the third eccentric element is rotatably arranged within said cavity. The fourth eccentric element in particular may be attached to the housing so that it is rotatable around an axis, which is eccentric with respect to the second axis of the third eccentric element.

A people conveyor according to an exemplary embodiment of the invention comprises a chain of conveyance elements which are configured for conveying people; a drive unit, which is configured for driving the chain of conveyance elements; and a self-locking gear according to one of the exemplary embodiments of the invention. The drive unit is connected to the input element of the self-locking gear and the chain of conveyance elements is connected to the output element of the self-locking gear so that the chain of conveyance elements is driven by the drive unit via the self-locking gear.

The people conveyor in particular may be an escalator in which the chain of conveyance elements is a step chain comprising a plurality of steps.

A method of operating a people conveyor according to an exemplary embodiment of the invention includes operating the drive unit in order to drive the chain of conveyance elements via the self-locking gear.

A method of operating a people conveyor according to an exemplary embodiment of the invention also includes braking the chain of conveyance elements by means of the self-locking gear when no torque is provided via the input element, i.e. when the drive unit is not driving the chain of conveyance elements via the self-locking gear.

A self-locking gear according to an exemplary embodiment of the invention is configured to transmit torque from the input element to the output element in normal driving operation, i.e. when the chain of conveying elements is driven by torque provided by the drive unit.

In case, however, no torque is provided via the input element of the self-locking gear, e.g. due to a failure of the drive unit or at least one of the transmission elements, the self-locking gear locks in order to brake the output element. Braking the output element by locking the self-locking gear avoids an undesirable uncontrolled movement of the chain of conveying elements, which is mechanically connected to the output element.

A self-locking gear according to an exemplary embodiment of the invention may be implemented in a configuration in which it may be integrated in a main drive shaft of a sprocket which is provided for driving the chain of conveying elements of a people conveyor. Such a configuration allows to integrate the self-locking gear into a people conveyor without increasing the space, which is necessary for the sprocket. As a result, a self-locking gear according to an exemplary embodiment of the invention may be added to existing people conveyor designs.

In the following, exemplary embodiments of the invention are described in more detail with reference to the enclosed figures.

Figure 1:
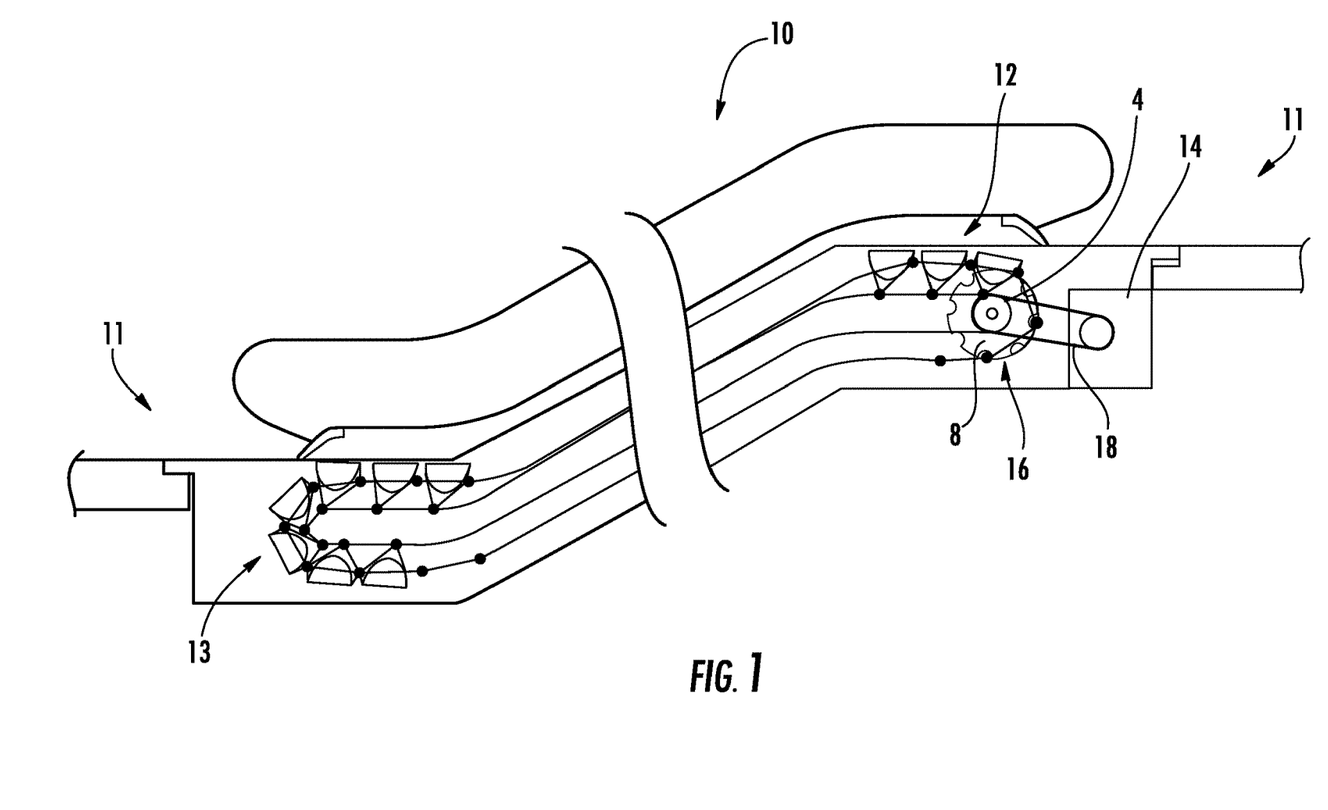
FIG. 1 shows a schematic side view of a people conveyor according to an exemplary embodiment of the invention.

FIG. 1 shows a schematic side view of a people conveyor 10 extending between two landings 11. In the exemplary embodiment shown in FIG. 1, the people conveyor 10 is an escalator comprising a plurality of steps 13. The skilled person, however, will understand that exemplary embodiments of the invention may include different kinds of people conveyors 10, in particular moving walkways, which comprise a plurality of pallets instead of steps 13. The steps 13 are arranged as a chain of conveyance elements 12. The chain of conveyance elements 12 is in engagement with a sprocket 16 mounted to a rotating shaft 8. A drive unit 14 is configured for driving the rotating shaft 8 and in consequence the sprocket 16 and the chain of conveyance elements 12 via a transmission element 18, which may be a chain, a belt or a gear train.

A self-locking gear device 20, 40 according to an exemplary embodiment of the invention is arranged within the rotating shaft 8, so that it is not visible in FIG. 1. Exemplary embodiments of a self-locking gear device 20, 40 will be described in more detail in the following with respect to FIGS. 2 to 9.

The rotating shaft 8 in particular may be an output element 8 of the self-locking gear device 20, 40. The transmission element 18 may be connected to an input element 4 of the self-locking gear device 20, 40. In such a configuration, the torque provided by the drive unit 14 is transmitted via the transmission element 18 to the input element 4 of the self-locking gear device 20, 40. The self-locking gear device 20, 40 is configured to transmit the torque to its output element 8 and to the sprocket 16, which is mounted to the output element 8.

Figure 2:
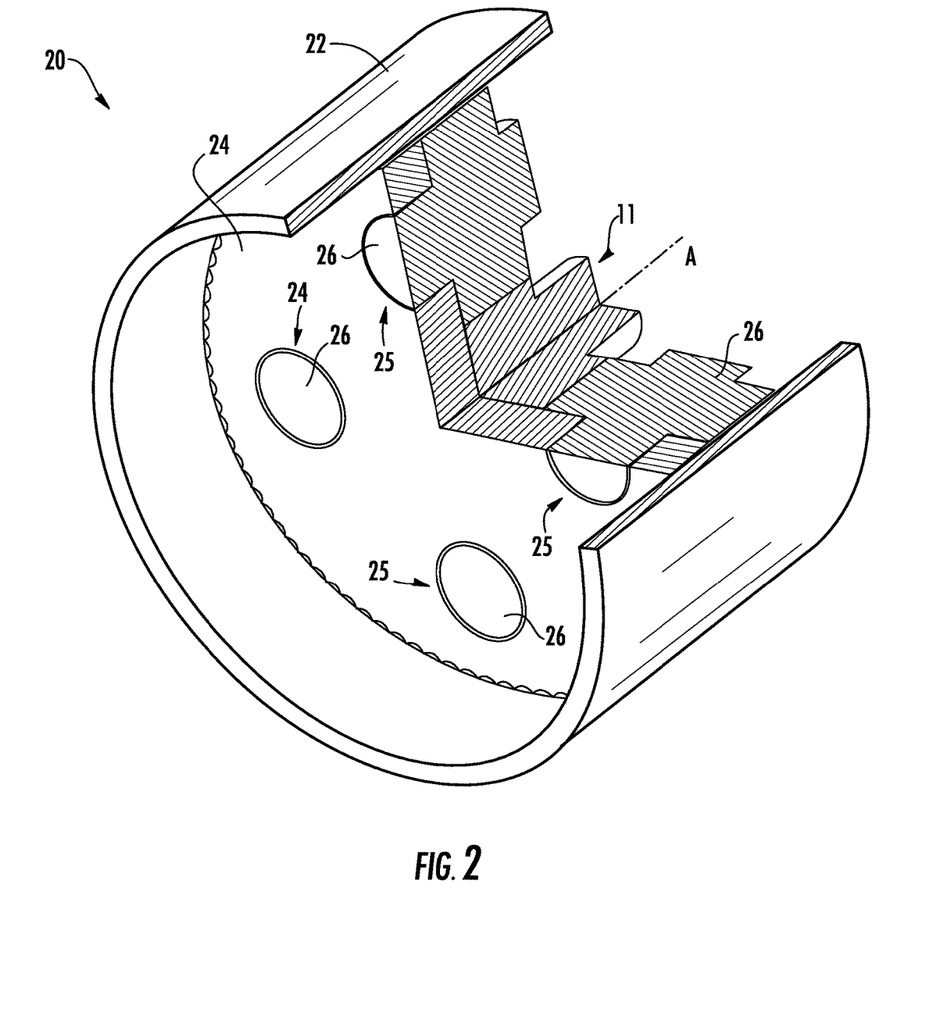
FIG. 2 shows a perspective sectional front view of a self-locking gear device according to a first exemplary embodiment of the invention.
Figure 3:
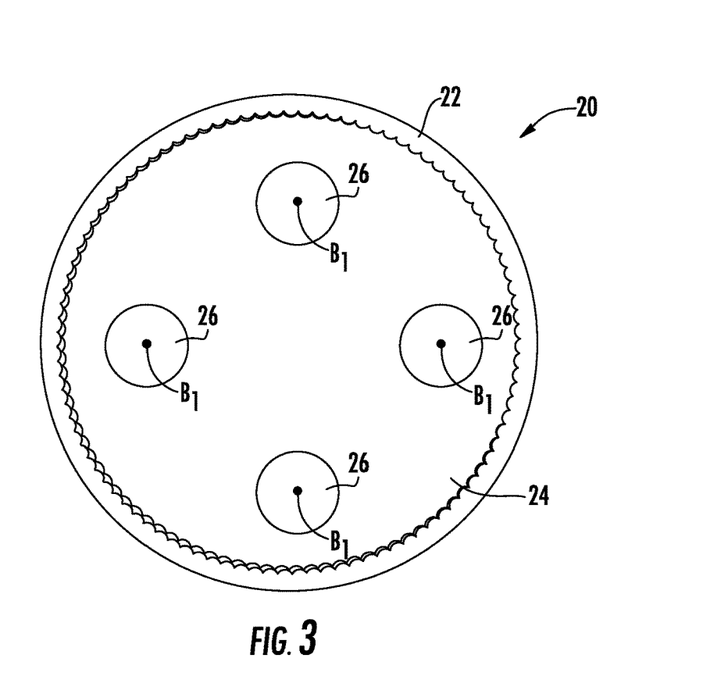
FIG. 3 shows a planar front view of the self-locking gear device shown in FIG. 2.
Figure 4:
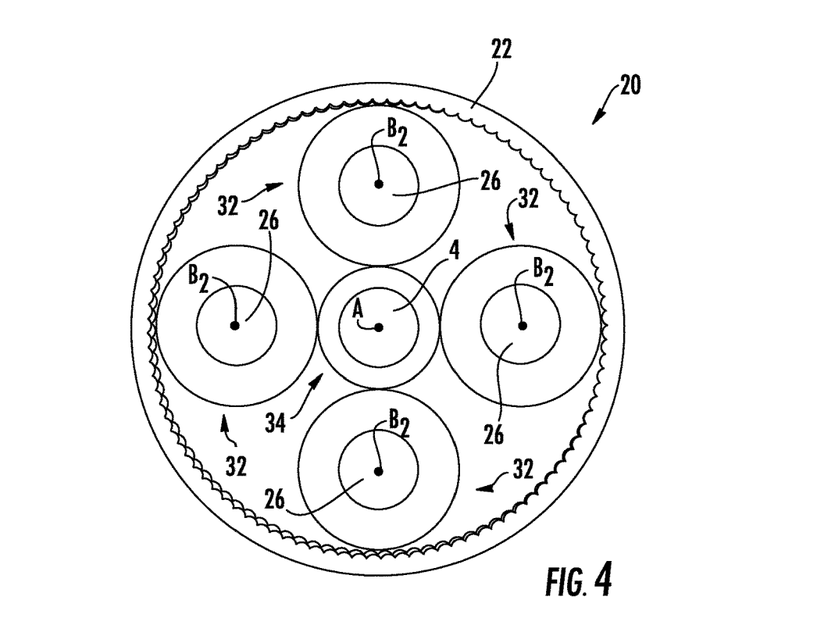
FIG. 4 shows a planar rear view of the self-locking gear device shown in FIGS. 2 and 3.
Figure 5:
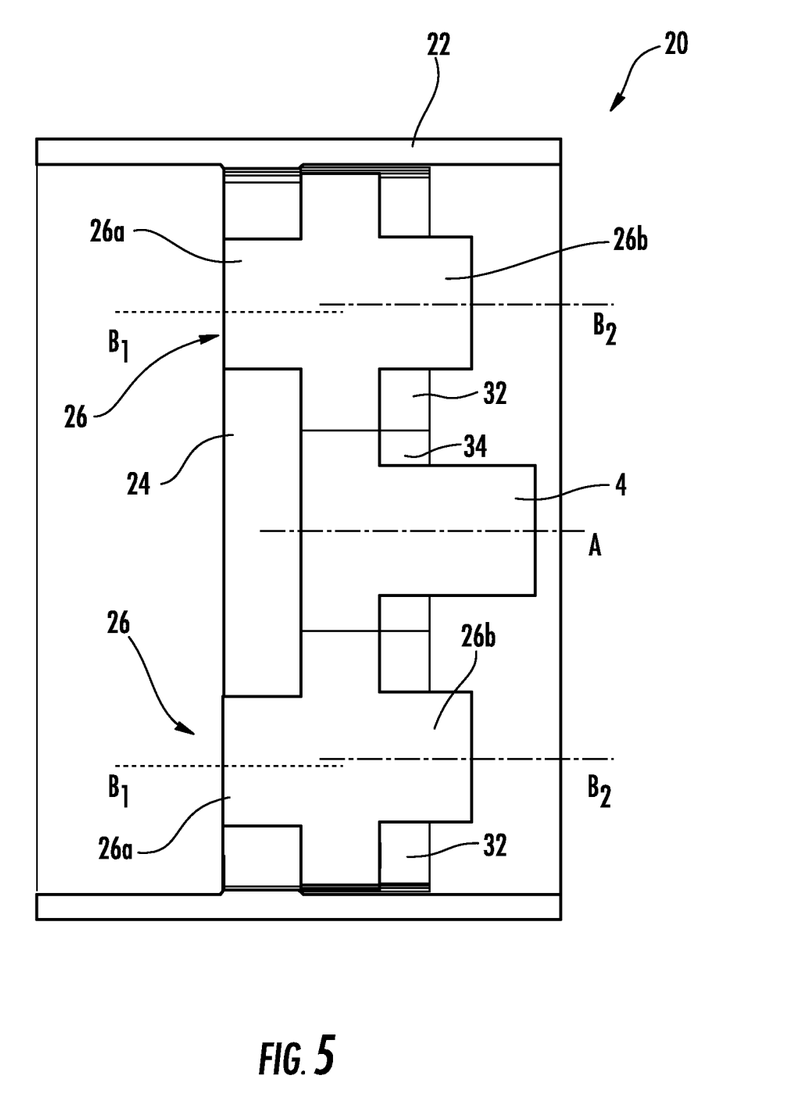
FIG. 5 shows a cross sectional view of the self-locking gear device shown in FIGS. 2 to 4.

FIG. 2 shows a perspective sectional front view of a self-locking gear device 20 according to a first exemplary embodiment of the invention. FIG. 3 shows a planar front view thereof, FIG. 4 shows a planar rear view, and FIG. 5 shows a cross sectional view of the self-locking gear device 20 shown in FIGS. 2 to 4 along an axis A.

The self-locking gear device 20 according to the first exemplary embodiment comprises a tubular shaped internally toothed outer gear 22 and an externally toothed inner gear 24. The externally toothed inner gear 24 is arranged within the outer gear 22. The externally toothed inner gear 24 in particular is provided in the form of a disk extending in a plane, which is oriented perpendicularly to the axis of the tubular shaped outer gear 22. The inner gear 24 has a (slightly) smaller diameter and fewer teeth than the outer gear 22. This allows the inner gear 24 to move eccentrically along a circular path within the outer gear 42.

Four openings 25 are formed within the inner gear 24. Each of the openings 25 extends parallel to an axis A of the tubular outer gear 22. The four openings 25 are arranged symmetrically with respect to the center of the inner gear 24. In consequence, the angular distance between two adjacent openings 25 is 90°. The self-locking gear device 20 further comprises four eccentric elements 26. A first cylindrical portion 26a of each eccentric element 26 is arranged in a corresponding opening 25 so that the first cylindrical portion 26a of each eccentric element 26 is rotatable around an axis B1 (see FIGS. 3 and 5), which is a common axis of the respective first cylindrical portion 26a and the corresponding opening 25.

Although the exemplary embodiment of the self-locking gear device 20 shown in FIGS. 2 to 5 comprises four openings 25 and four eccentric elements 26, the skilled person will understand that different numbers of openings 25 and eccentric elements 26 may be employed as well. Of course, in a configuration having a different number of openings 25 and eccentric elements 26, the angular distance between adjacent openings 25 and eccentric elements 26 will differ from 90°.

Each eccentric element 26 further comprises a second cylindrical portion 26b, which is arranged outside the inner gear 24 on a "rear side" of the self-locking gear device 20, which is shown in FIG. 4. The "rear side" of the self-locking gear device 20 is shown on the right side in FIGS. 2 and 5.

The axis B2 of the second cylindrical portion 26b of each eccentric element 26 is shifted with respect to the axis B1 of the second cylindrical portion 26a so that the two axes B1, B2 are arranged not coaxially but eccentric with respect to each other (see FIG. 5). In consequence, the axis B1 of the first cylindrical portion 26a moves along a circular path around the axis B2 of the second cylindrical portion 26b, when the second cylindrical portion 26b rotates around axis B2.

The second cylindrical portions 26b of the eccentric elements 26 are provided with first outer teeth 32 on their peripheral outer surfaces. The first outer teeth 32 may be formed integrally with the outer peripheral surfaces of the second cylindrical portions 26b. Alternatively, spur gears with first outer teeth 32 may be mounted to the second cylindrical portions 26b of the eccentric elements 26.

The first outer teeth 32 of the eccentric elements 26 are in engagement with corresponding second outer teeth 34 formed on the input element 4, which is arranged in the center of the outer gear 22 coaxially with axis A. The second outer teeth 34 may be formed integrally with the outer peripheral surface of input element 4. Alternatively, a spur gear with second outer teeth 34 may be mounted to the input element 4.

In normal driving operation, the input element 4 rotates around its axis, which is arranged coaxially with the axis A of the outer gear 22, by means of a motor (not shown), e.g. a motor of the drive unit 14 of the people conveyor 50 (see FIG. 1).

The rotation of the input element 4 is transmitted via the engaging first and second outer teeth 32, 34 to the four eccentric elements 26, which thereupon rotate around the second axes B2 of their respective second cylindrical portions 26b. In consequence, the first axes B1 of the first cylindrical portions 26a of the eccentric elements 26 move along a circular path around said second axes B2. Simultaneously, the first cylindrical portions 26a of the eccentric elements 26 rotate around their first axes B1 within the openings 25 formed within the inner gear 24.

As a result, the inner gear 24 moves along an eccentric path within the outer gear 22. The inner and outer gears 24, 24 mesh without sliding velocity Due to the engagement of the outer teeth formed on the outer periphery of the inner gear 24 with the (slightly) larger number of inner teeth formed on the inner periphery of the outer gear 22, the described movement of the inner gear 24 causes the outer gear 22 to rotate with a rotational speed that is smaller than the rotational speed of the input element 4. The ration of the rotational speeds of the inner and outer gears 24, 22 depends on the difference in the number of teeth between said gears 24, 22. The outer gear 22 is integrally formed with or mechanically connected to the output element 8, which provides the rotational output of the self-locking gear device 20.

When no rotational input (torque) is provided via the input element 4 so that it does not rotate, e.g. due to a failure of the drive unit 14 and/or of the transmission device 18, but rotational input (torque) is provided via the output element 8/outer gear 22, the inner gear 24 and the eccentric elements 26 will move into a position, in which the forces acting on the eccentric elements 26 block the eccentric elements 26 preventing any further movement of the outer and inner gears 22, 24. As a result, any uncontrolled movement of the output element 8 and the chain of conveyance elements 12 is reliably prevented.

Figure 6A:
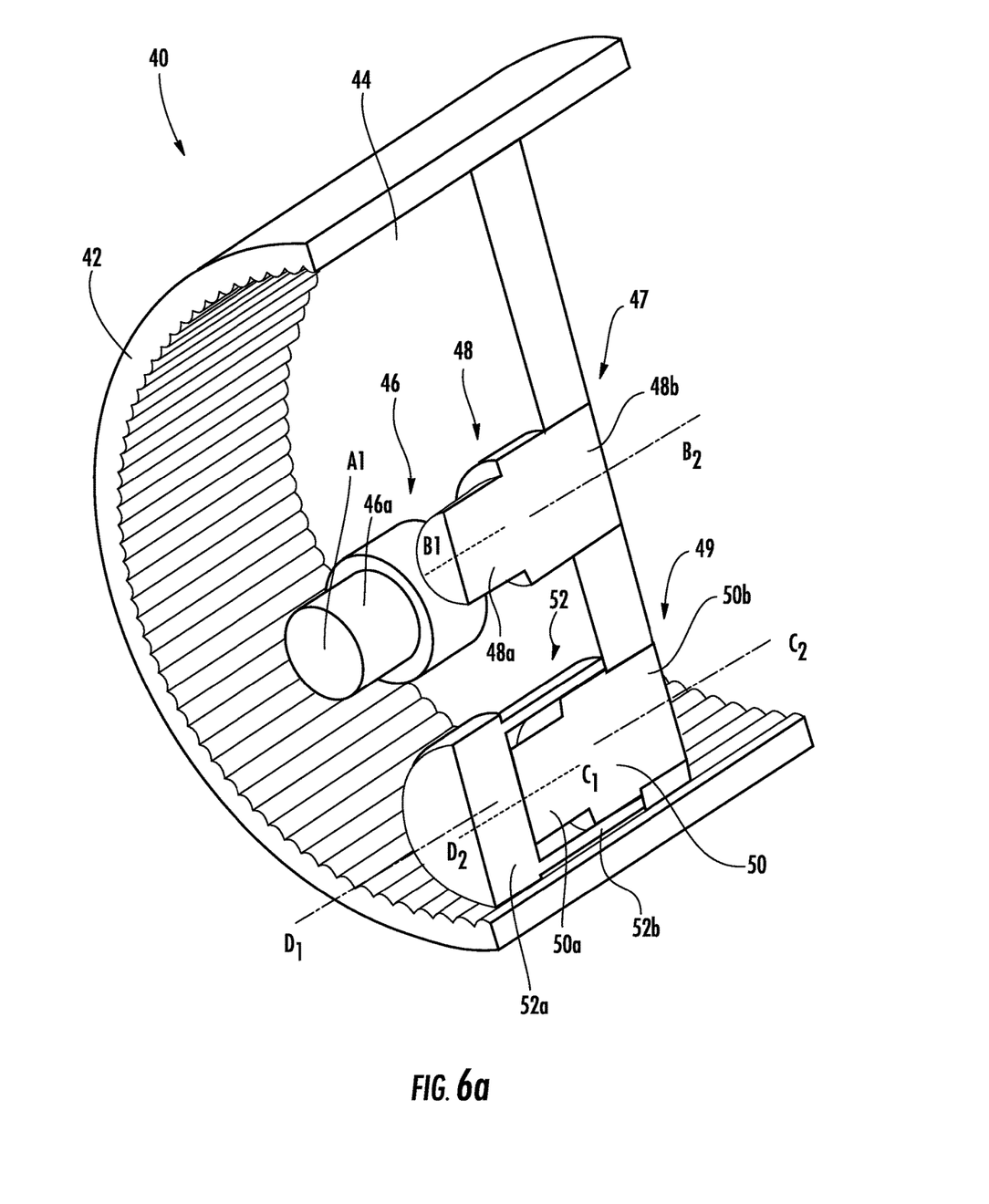
FIG. 6a shows a perspective sectional front view of a self-locking gear device according to a second exemplary embodiment of the invention without its housing.
Figure 6B:
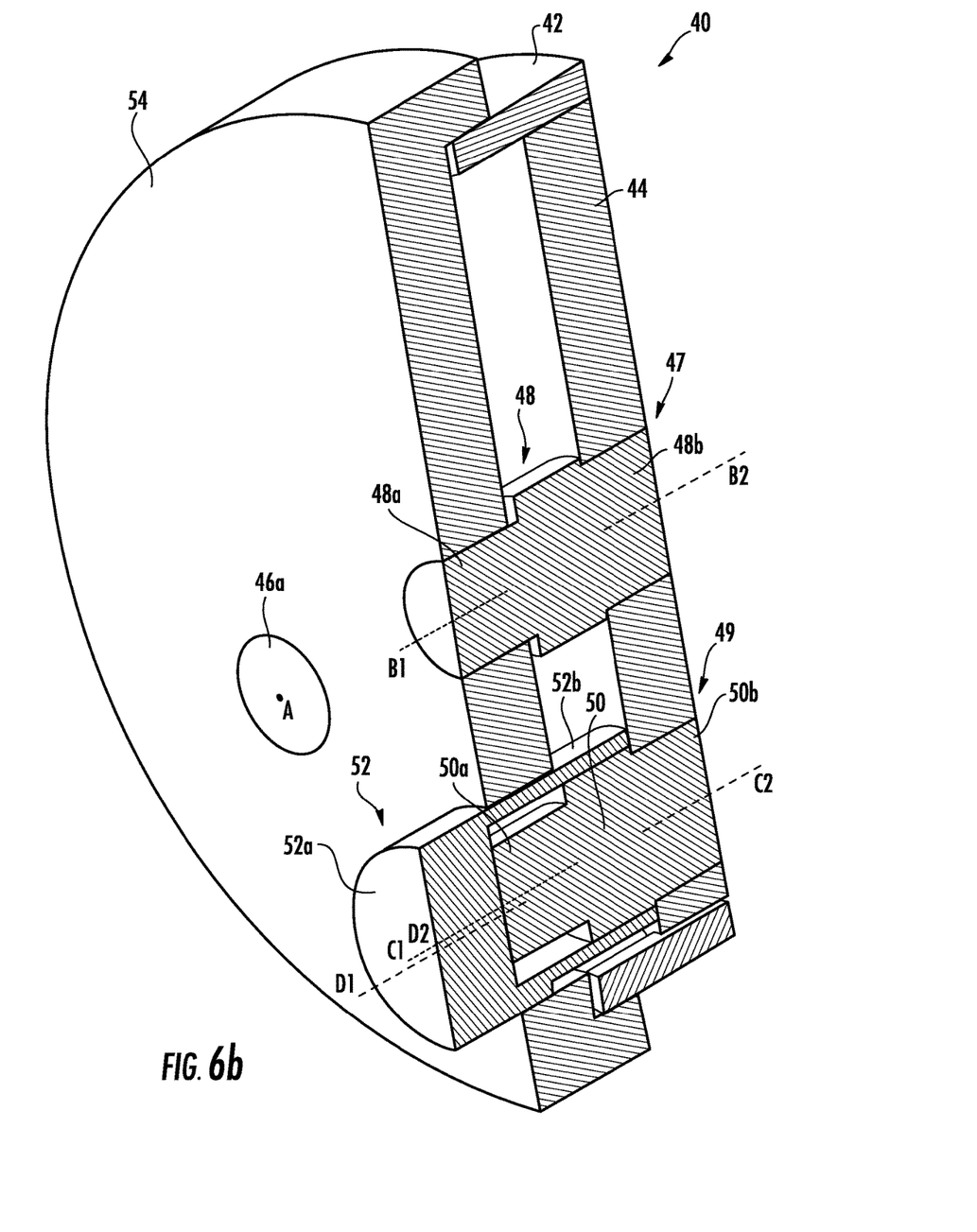
FIG. 6b shows a perspective sectional front view of the self-locking gear device shown in FIG. 6a with its housing.
Figure 7:
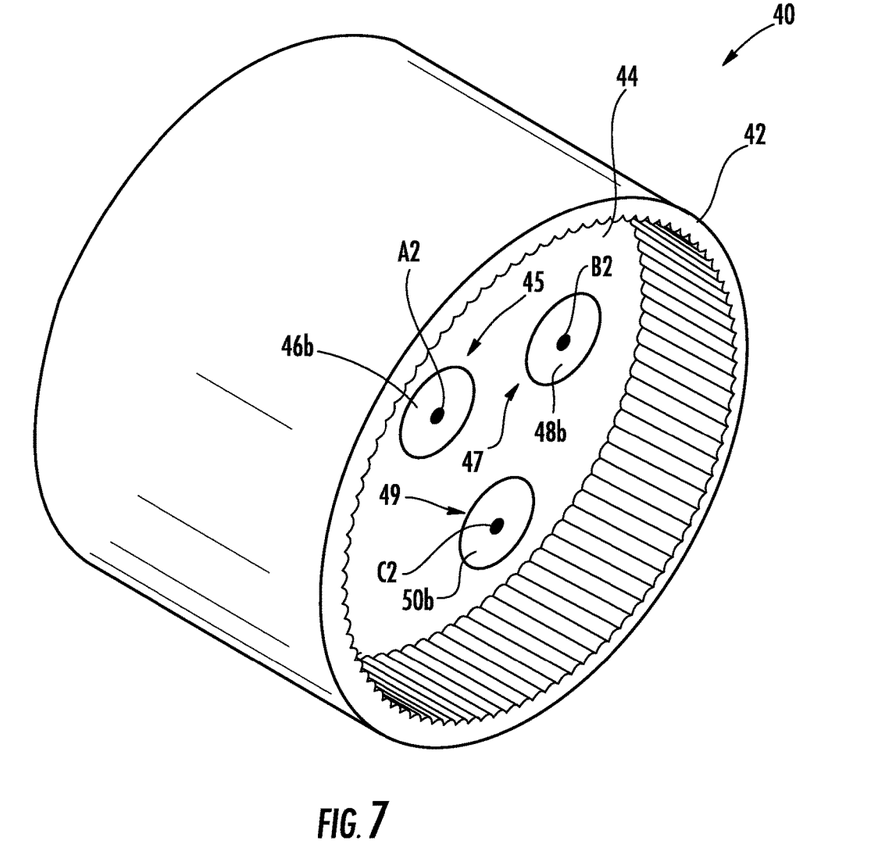
FIG. 7 shows a perspective rear view of the self-locking gear device shown in FIGS. 6a and 6b.
Figure 8:
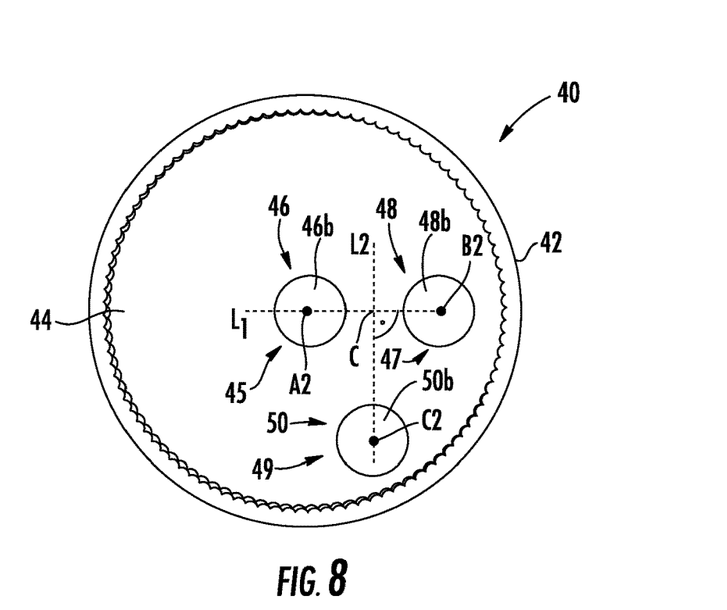
FIG. 8 shows a planar rear view of the self-locking gear device shown in FIGS. 6a, 6b, and 7.
Figure 9:
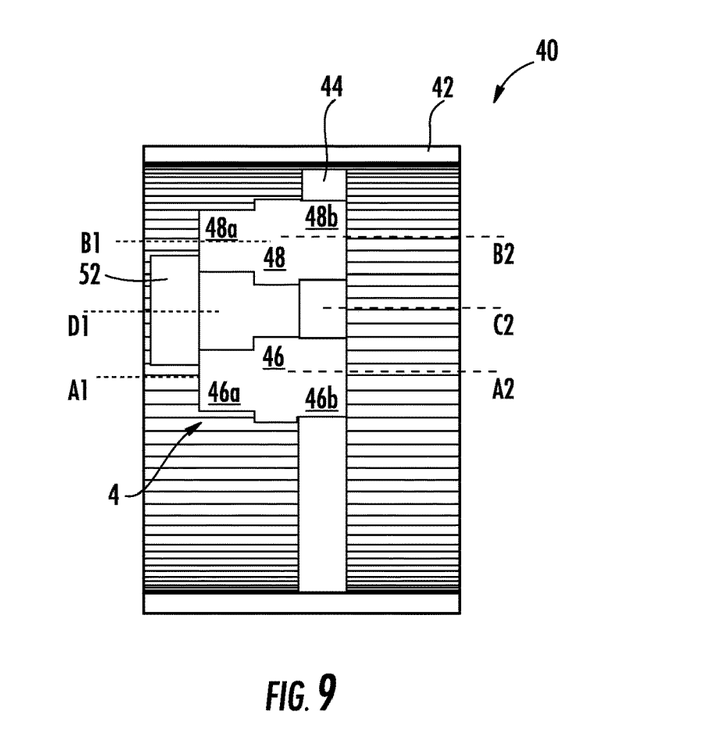
FIG. 9 shows a cross sectional view of the self-locking gear device shown in FIGS. 6a, 6b, 7, and 8.

FIGS. 6*a* and 6*b* respectively show a perspective sectional front view of a self-locking gear device 40 according to a second exemplary embodiment of the invention. FIG. 7 shows a perspective rear view thereof, FIG. 8 shows a planar rear view, and FIG. 9 shows a cross sectional view of the self-locking gear device 40. In order to simplify the drawings, the housing 54 of the self-locking gear device 40 is shown only in FIG. 6*b*.

The self-locking gear device 40 according to the second exemplary embodiment comprises a tubular shaped integrally toothed outer gear 42 and an externally toothed inner gear 44. The externally toothed inner gear 44 is arranged within the outer gear 42. The externally toothed inner gear 44 in particular is provided in the form of a disk extending in a plane, which is oriented perpendicularly to the axis of the tubular shaped outer gear 42. The inner gear 44 has a (slightly) smaller diameter and fewer teeth than the tubular shaped outer gear 42. This allows the inner gear 44 to move eccentrically along a circular path within the tubular shaped outer gear 42.

Three circular openings 45, 47, 49, which respectively extend parallel to an axis of the tubular outer gear 42, are formed within the inner gear 44. A first opening 45 is located close to, but slightly offset from, the center of the inner gear 44. Second and third openings 47, 49 are formed in a larger distance from the center of the inner gear 44 in a radial direction. The third opening 49 in particular is located on a virtual line L2 extending orthogonally through the center C of a virtual line L1 connecting the first and second openings 45, 47 (see FIG. 8).

A first eccentric element 46 is arranged within the first opening 45. The first eccentric element 46 in particular comprises a first cylindrical portion 46*a* facing the front side of the self-locking gear device 40, which is shown on the left side of FIGS. 6, 7, and 9. The first cylindrical portion 46*a* of the first eccentric element 46 is arranged coaxially with the axis of the tubular shaped outer gear 42 (axis of the self-locking gear device 40) and is configured to act as an input element 4 of the self-locking gear device 40.

The first eccentric element 46 further comprises a second cylindrical portion 46*b*, which is rotatably arranged within the first opening 45. The axes A1, A2 of the first and second cylindrical portions 46*a*, 46*b* (see FIG. 9) are offset with respect to each other, i.e. the axes A1, A2 of the first and second cylindrical portions 46*a*, 46*b* are not arranged coaxially with each other. As a result, the inner gear 44 performs an eccentric motion within the tubular outer gear 42, when the first cylindrical portion 46*a* of the first eccentric element 46 (input element 4) rotates around its axis A1.

Due to the engagement of the outer teeth formed on the outer periphery of the inner gear 44 with the (slightly) larger number of inner teeth formed on the inner periphery of the outer gear 42, the described movement of the inner gear 44 causes the outer gear 42 to rotate with a rotational speed that is considerably smaller than the rotational speed of the first cylindrical portion 46*a* of the first eccentric element 46 acting as an input element 4. The outer and inner gears 44, 42 mesh without sliding velocity. The outer gear 52 is integrally formed with, or mechanically connected to, the output element 8, which provides the rotational output of the self-locking gear device 40.

Second and third eccentric elements 48, 50 are rotatably arranged within the second and third openings 47, 49, which are formed within the inner gear 44, respectively.

Each of the second and third eccentric elements 48, 50 comprises a first cylindrical portion 48*a*, 50*a* facing the front side of the self-locking gear device 40, which is shown on the left side in FIGS. 6, 7, and 9, and a second cylindrical portion 48*b*, 50*b* facing the rear side of the self-locking gear device 40 (see FIG. 8) and being arranged within a corresponding opening 47, 49 formed within the internal gear 44.

The axes B1, B2, C1, and C2 of the first and second cylindrical portions 48*a*, 48*b*, 50*a*, 50*b* are offset with respect to each other, i.e. the axes B1, B2, of the first cylindrical portions 48*a*, 50*a*, and the axes C1, C2 of the second cylindrical portions 48*b*, 50*b*, are not arranged coaxially with each other, respectively.

In consequence, the second cylindrical portions 48*b*, 50*b* of the second and third eccentric elements 48, 50 rotate around their respective second axis B2, C2, when the inner gear 44 is moved by rotating the first eccentric element 46, which acts as an input element 4. Additionally, said second axes B2, C2 move along a circular path around the axis B1, C1 of the first cylindrical portions 48*a*, 50*a*.

The first cylindrical portion 50*a* of the third eccentric element 50 is inserted into a cavity which is formed within a fourth eccentric element 52.

The fourth eccentric element 52 comprises a first cylindrical portion 52*a* facing the front side of the self-locking gear device 40, which is shown on the left side in FIGS. 6, 7, and 9, and an opposing second cylindrical portion 52*b* including the cylindrical cavity, which rotatably accommodates the first cylindrical portion 50*a* of the third eccentric element 50.

The axis D1 of the first cylindrical portion 52*a* is offset with respect to the axis D2 of the cavity/second cylindrical portion 52*b*, i.e. the axis D1 of the first cylindrical portion 52*a* is not arranged coaxially with the common axis C1, D2 of the cavity and the second cylindrical portion 52*b*.

The first cylindrical portions 48*a*, 52*a* of the second and fourth eccentric elements 48, 52 are attached to the housing 54 (see FIG. 6*b*) of the self-locking gear device 40 so that they are rotatable around their respective first axes B1, D1. As a result, the axis C1 of the first portion 50*a* of the third eccentric element 50, which is coaxial with the axis D2 of the cavity/second cylindrical portion 52*b* of the fourth eccentric element 52 moves along a circular path when the first eccentric element 46 (input element 4) rotates and moves the inner gear 44.

However, when no rotational input (torque) is provided via the input element 4 (first eccentric element 46) so that it does not rotate, but rotational input (torque) is provided via the output element 8 to the outer gear 42, the inner gear 44 and the eccentric elements 46, 48, 50 move into dead-point positions, in which the forces acting on the eccentric elements 46, 48, 50 block the eccentric elements 46, 48, 50 preventing any further movement of the outer and inner gears 42, 44. As a result, any uncontrolled movement of the output element 8 and the chain of conveyance elements 12 is reliably prevented.

A number of optional features are set out in the following. These features may be realized in particular embodiments, alone or in combination with any of the other features, unless specified otherwise.

In a variant of the first embodiment each eccentric element may comprise a first cylindrical portion, which is rotatably received within the corresponding circular opening formed in the inner gear, wherein an axis of the first cylindrical portion is the first axis. In one embodiment each of the at least two eccentric elements may comprise a second cylindrical portion, wherein the axis of the second cylindrical portions is the second axis. The second cylindrical portions in particular may be arranged outside the inner gear. Such configurations provide efficient and robust eccentric elements, which are capable to bear high loads.

In a variant of the first embodiment external teeth may be formed on each second cylindrical portion. The external teeth may engage with corresponding external teeth, which are formed on the outer periphery of the input element or on a spur gear mounted to the input element. Engaging external teeth allows for an efficient transfer of rotational motion and/or torque between the input element and the eccentric elements.

In a variant of the first embodiment the self-locking gear may comprise at least four eccentric elements; the self-locking gear in particular may comprise exactly four eccentric elements. Four or more eccentric elements result in efficient self-locking properties.

In a variant of the first embodiment each of the eccentric elements is driven by the input element in order to provide for an equalized transfer of torque from the input element to the eccentric elements.

In a variant of the second embodiment, the fourth eccentric element may be attached to the housing so that it is rotatable around a third axis, which is eccentric with respect to the second axis. Such a configuration allows to provide a reliable and compact self-locking gear.

In a variant of the second embodiment the third eccentric element may be located on a second virtual line extending orthogonally through the center of a first virtual line which connects the first and second eccentric elements. Such an arrangement of the eccentric elements results in an effective locking of the self-locking gear.

In a variant of the first or second embodiment the difference in the number of teeth between the inner gear and the outer gear is less than 10. This results in a high reduction of the rotational speed of the output element with respect to the input element.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the dependent claims.

REFERENCES 4 input element
8 output element/rotating shaft
10 people conveyor
11 landings
12 chain of conveyance elements
13 steps
14 drive unit
16 sprocket
18 transmission element
20 self-locking gear (first embodiment)
22 outer gear
24 inner gear
25 opening
26 eccentric elements
26a first cylindrical portion of the eccentric element
26b second cylindrical portion of the eccentric element
32 first outer teeth
34 second outer teeth
40 self-locking gear (second embodiment)
42 outer gear
44 inner gear
45 first opening
46 first eccentric element
46a first cylindrical portion of the first eccentric element
46b second cylindrical portion of the first eccentric element
47 second opening
48 second eccentric element
48a first cylindrical portion of the second eccentric element
48b second cylindrical portion of the second eccentric element
49 third opening
50 third eccentric element
50a first cylindrical portion of the third eccentric element
50b second cylindrical portion of the third eccentric element
52 fourth eccentric element
52a first cylindrical portion of the fourth eccentric element
52b second cylindrical portion of the fourth eccentric element
54 housing
A axis of the self-locking gear/outer gear
A1, B1, C1, D1 axes of the first cylindrical portions
A2, B2, C2, D2 axes of the second cylindrical portions
C center of the first virtual line L1
L1 first virtual line
L2 second virtual line

What is claimed is:

1. A self-locking gear (20) comprising:
a rotatable input element (4);
an internally toothed outer gear (22), which is configured to act as an output element (8);
an externally toothed inner gear (24), which is arranged within the outer gear (22) and which has a smaller diameter and fewer teeth than the outer gear (22); and
a plurality of eccentric elements (26) extending parallel to the input element (4), wherein each of the eccentric elements (26) is arranged in a corresponding circular opening (25) formed within the inner gear (24) such that the eccentric element (26) is rotatable around a first axis (B1) extending through the center of the respective circular opening (25);
wherein the input element (4) is drivingly coupled to at least two eccentric elements (26) such as to rotate each of the at least two eccentric elements (26) around a respective second axis (B2), which extends parallel and eccentric to the first axis (B1) of the respective eccentric element (26).

2. The self-locking gear (20) according to claim 1, wherein each eccentric element (26) comprises a first cylindrical portion (26a), which is rotatably received within the corresponding circular opening (25) formed in the inner gear (24), and wherein the axis of the first cylindrical portion (26a) is the first axis (B1).

3. The self-locking gear (20) according to claim 2, wherein each of the at least two eccentric elements (26) comprises a second cylindrical portion (26b), and wherein the axis of the second cylindrical portion (26a b) is the second axis (B2).

4. The self-locking gear (20) according to claim 3, wherein the second cylindrical portions (26b) are arranged outside the inner gear (24).

5. The self-locking gear (20) according to claim 3, wherein first external teeth (32) are formed on each second cylindrical portion (26b), and wherein said first external teeth (32) engage with corresponding second external teeth (34) formed on the outer periphery of the input element (4) or on a spur gear mounted to the input element (4).

6. The self-locking gear (20) according to claim 1, wherein the openings (25) and the eccentric elements (26) are arranged symmetrically with respect to the center of the inner gear (24).

7. The self-locking gear (20) according to claim 1, comprising at least four eccentric elements (26).

8. The self-locking gear (20) according to claim 7, wherein each of the at least four eccentric elements (26) is driven by the input element (4).

9. A people conveyor (10) comprising:
a chain of conveyance elements (12) which are configured for conveying people;
a drive unit (14), which is configured for driving the chain of conveyance elements (12);
a self-locking gear (20; 40) according to claim 1,
wherein the drive unit (14) is connected to the input element (4) of the self-locking gear (20; 40) and wherein the chain of conveyance elements (12) is connected to the output element (22; 42) of the self-locking gear (20; 40).

10. The people conveyor (10) according to claim 9, wherein
the people conveyor (10) is an escalator; and
the chain of conveyance elements (12) is a step chain comprising a plurality of steps (13).

11. Method of operating a people conveyor according to claim 9 , wherein the method includes operating the drive unit (14) for driving the chain of conveyance elements (12) via the self-locking gear (20; 40), and/or wherein the method includes braking the chain of conveyance elements (12) by means of the self-locking gear (20; 40) when the drive unit (14) is not driving the chain of conveyance elements (12) via the self-locking gear (20; 40).

12. A self-locking gear (40) comprising:
a housing (54);
an internally toothed outer gear (42), which is rotatable with respect to the housing (54) and which is configured to act as an output element (8),
an externally toothed inner gear (44), which is arranged within the outer gear (42) and which has a smaller diameter and fewer teeth than the outer gear (42);
a first eccentric (46) element comprising a first cylindrical portion (46a), which is configured to act as an input element (4), and a second cylindrical portion (46b), which is eccentric with respect to the first cylindrical portion (46a) and which is connected to the inner gear (24) so that the inner gear (24) moves along an eccentric path when the input element (4) rotates around the axis of the first cylindrical portion (46a);
second and third eccentric elements (48, 50) extending parallel to the first eccentric element (46), wherein each of the second and third eccentric elements (48, 50) comprises
a first cylindrical portion (48a, 50a) having a first axis (B1, C1),
a second cylindrical portion (48b, 50b) having a second axis (B2, C2), which extends parallel and eccentric to the first axis (B1, C1), wherein the second cylindrical portion (48b, 50b) is arranged in a corresponding circular opening (47, 49) formed within the inner gear (24) such that the respective eccentric element (48, 50) is rotatable around the second axis (B2, C2); and
a fourth eccentric element (52), which is attached to the housing (54) and which comprises a cavity, wherein the second cylindrical portion (50b) of the third eccentric element (50) is rotatably arranged within said cavity.

13. The self-locking gear (40) of claim 12, wherein the fourth eccentric element (52) is attached to the housing (54) so that it is rotatable around an axis (D1), which is eccentric with respect to the second axis (C2) of the third eccentric element (50).

14. The self-locking gear (40) of claim 12, wherein the third eccentric element (50) is located on a second virtual line (L2) extending orthogonally through the center (C) of a first virtual line (L1) connecting the first and second eccentric elements (46,48).

15. The self-locking gear (20; 40) according to claim 12, wherein the difference in the number of teeth between the inner gear (24; 44) and the outer gear (22; 42) less than 10.

* * * * *